(12) United States Patent
Holgerson et al.

(10) Patent No.: US 12,108,717 B2
(45) Date of Patent: Oct. 8, 2024

(54) GREENHOUSE SCREEN (71) Applicant: AB LUDVIG SVENSSON, Kinna (SE)

(72) Inventors: Per Holgerson, Brämhult (SE); Daniel Asplund, Landvetter (SE)

(73) Assignee: AB Ludvig Svensson, Kinna (SE)

(*) Notice: Subject to any disclaimer, the term of this patent is extended or adjusted under 35 U.S.C. 154(b) by 1254 days.

(21) Appl. No.: 16/644,312

(22) PCT Filed: Sep. 13, 2018

(86) PCT No.: PCT/EP2018/074773
§ 371 (c)(1),
(2) Date: Mar. 4, 2020

(87) PCT Pub. No.: WO2019/053139
PCT Pub. Date: Mar. 21, 2019

(65) Prior Publication Data
US 2020/0205353 A1 Jul. 2, 2020

(30) Foreign Application Priority Data

Sep. 14, 2017 (SE) .................................. 1751124-7

(51) Int. Cl.
A01G 9/14 (2006.01)
B32B 7/09 (2019.01)
(Continued)

(52) U.S. Cl.
CPC .............. *A01G 9/1438* (2013.01); *B32B 7/09* (2019.01); *B32B 27/08* (2013.01); *B32B 27/18* (2013.01);
(Continued)

(58) Field of Classification Search
None
See application file for complete search history.

(56) References Cited

U.S. PATENT DOCUMENTS 4,571,363 A * 2/1986 Culbertson .............. G03C 1/93
428/483
4,626,465 A 12/1986 Henningsson
(Continued)

FOREIGN PATENT DOCUMENTS

CN 103538336 A 1/2014
CN 104053731 A 9/2014
(Continued)

OTHER PUBLICATIONS https://patents.google.com/patent/EP0144948A2/en?oq=EP0144948A2 (Year: 1983).*
(Continued)

*Primary Examiner* — Arti Singh-Pandey
(74) *Attorney, Agent, or Firm* — Renner, Otto, Boisselle & Sklar, LLP (57) ABSTRACT A greenhouse screen comprising strips of film material that are interconnected by a yarn system of transverse threads and longitudinal threads by means of a knitting, warp-knitting or weaving process to form a continuous product is provided. At least some of the strips comprise a polyester film having a transparency of at least 93%, said polyester film having at least one base layer B comprising a thermoplastic polyester and a UV stabilizer. The polyester film has a first and a second surface, wherein a permanent anti-fog coating is applied to at least one of the first or second surfaces of the polyester film. The anti-fog coating has a lower refractive index than the base layer B. A process for producing said film is also disclosed.

27 Claims, 2 Drawing Sheets (51) Int. Cl.
*B32B 27/08* (2006.01)
*B32B 27/18* (2006.01)
*B32B 27/36* (2006.01)
*C09D 5/00* (2006.01)
*C09D 133/12* (2006.01)
*D06M 15/263* (2006.01)
*D06M 15/507* (2006.01)
*D06M 15/643* (2006.01)

(52) U.S. Cl.
CPC ............ *B32B 27/36* (2013.01); *C09D 5/00* (2013.01); *C09D 5/006* (2013.01); *C09D 133/12* (2013.01); *D06M 15/263* (2013.01); *D06M 15/507* (2013.01); *D06M 15/643* (2013.01); *A01G 2009/1461* (2013.01); *B32B 2255/10* (2013.01); *B32B 2255/26* (2013.01); *B32B 2307/412* (2013.01); *B32B 2307/418* (2013.01); *B32B 2307/518* (2013.01); *B32B 2410/00* (2013.01)

(56) References Cited

U.S. PATENT DOCUMENTS

| | | |
|---|---|---|
| 5,262,233 A | 11/1993 | Sudo et al. |
| 5,753,373 A | 5/1998 | Scholz et al. |
| 2006/0008638 A1 | 1/2006 | Kiehne et al. |
| 2007/0087188 A1 | 4/2007 | Konrad et al. |
| 2011/0016779 A1 | 1/2011 | Hermans et al. |
| 2011/0274912 A1 | 11/2011 | Nakao et al. |
| 2014/0147649 A1 | 5/2014 | Su et al. |
| 2014/0335360 A1 | 11/2014 | Jing et al. |
| 2015/0013217 A1 | 1/2015 | Johnson et al. |

FOREIGN PATENT DOCUMENTS

| | | |
|---|---|---|
| CN | 105058934 A | 11/2015 |
| CN | 105058935 A | 11/2015 |
| DE | 2346787 A1 | 3/1975 |
| EP | 0109951 A1 | 5/1984 |
| EP | 0144948 A2 | 6/1985 |
| EP | 0732387 A1 | 9/1996 |
| EP | 0769540 A2 | 4/1997 |
| EP | 1152027 A1 | 7/2001 |
| EP | 1534776 A1 | 11/2001 |
| EP | 1760120 A2 | 3/2007 |
| EP | 1777251 A1 | 4/2007 |
| EP | 1647568 B1 | 1/2009 |
| EP | 2216362 A1 | 8/2010 |
| JP | 2000272068 A | 10/2000 |
| JP | 2003061484 A | 3/2003 |
| JP | 2004099695 A | 4/2004 |
| JP | 2001320986 A5 | 6/2006 |
| JP | 2007211213 A | 8/2007 |
| JP | 2008067645 A | 3/2008 |
| JP | 2014531990 A | 12/2014 |
| JP | 2017213891 A | 12/2017 |
| KR | 1020150049498 A | 5/2015 |
| KR | 1020160035296 A | 3/2016 |
| RU | 2195468 C2 | 12/2002 |
| RU | 2561455 C2 | 8/2015 |
| WO | 199518210 | 7/1995 |
| WO | 199722655 | 6/1997 |
| WO | 1997039058 A1 | 10/1997 |
| WO | 2013041524 | 3/2013 |
| WO | 2017125575 | 7/2017 |

OTHER PUBLICATIONS

International Search Report and Written Opinion for corresponding International Application No. PCT/EP2018/074773 dated Dec. 19, 2018.

International Preliminary Report on Patentability for corresponding International Application No. PCT/EP2018/074773 dated Mar. 12, 2019.

* cited by examiner

GREENHOUSE SCREEN

This application is a national phase of International Application No. PCT/EP2018/074773 filed Sep. 13, 2018 and published in the English language, which claims priority to Swedish Application No. 1751124-7 filed Sep. 14, 2017, both of which are hereby incorporated herein by reference.

TECHNICAL FIELD

The present disclosure refers to a greenhouse screen of the kind comprising a plurality of flexible strips of film, which are interconnected by a yarn framework by means of knitting, warp-knitting or a weaving process to form a continuous product. More specifically the disclosure refers to a shade screen wherein at least some of the film strips comprise a single- or multilayer coated transparent, biaxially oriented, UV-stable polyester film that on at least one side comprises a permanent antifog, and anti-reflective (anti-glare) coating. The greenhouse screen has specific transparency properties, permanent anti-fog properties and a high UV stability.

BACKGROUND

Films for greenhouse screens for use in greenhouses must meet a number of requirements. On the one hand, the part of the light required for plant growth has to pass through the greenhouse screens, while the unwanted part of the light, which would lead to an excessive heating of the greenhouse, should be reflected. During the night and in the early hours of the morning, the greenhouse energy saving screens should also act as a convection brake by re-radiating heat rising from the ground in the greenhouse, as well as reflecting any artificial light ensuring an optimum light incidence inside the greenhouse.

In the photosynthetic wavelength range a high light transmittance is required for optimum plant growth. Due to the typically high atmospheric humidity inside the greenhouse and in particular during appropriate weather conditions (for example temperature differences between day and night), condensation water in the form of water droplets arises on the surface of the plant-facing side of greenhouse screens.

Water droplets, in contrast to a liquid film, give a strong light-reflecting and intensely reflective effect, which lead to a significantly lower photosynthesis, especially in the light-poor morning hours. Furthermore, the damage of plants and plant parts by non-adhering or dripping water droplets is avoided as well as the combustion phenomena caused by drops on the film surface that may in the event of a light incidence act as focal lenses damaging plants and plant parts. Therefore, it is important to avoid impairment of light permeability as far as possible also in weather conditions where condensation water forms on the greenhouse screens. In addition to the weather conditions, the different surface tensions of water and plastic promote condensation. Films with antifogging properties prevent water drop formation and allow a clear view through the plastic film.

In general, anti-fog additives can be incorporated into the polymer matrix during the extrusion process or applied to the polymer matrix as a coating. Such anti-fog additives are generally divalent compounds which have a non-polar aliphatic region for anchoring in the polymer matrix and a polar hydrophilic region which can interact with water to reduce the surface tension of the water droplets so that a continuous transparent water film (due to a hydrophilic surface) on the film surface is formed.

The use of anti-fog additives should not adversely affect the translucence and thus the transparency of the greenhouse foils in order not to reduce the harvest yield.

Furthermore, it is desirable for the greenhouse film to have a UV stability that allows the greenhouse screen to be used for at least 5 years in a greenhouse without significantly yellowing, embrittlement or cracking on the surface, serious deterioration of mechanical properties or significantly detracting in transparency.

In the event that the formation of droplets occurs with very pronounced formation of condensation, the anti-fog component must not contain any toxic or particularly environmentally harmful substances. Among the undesired substances are, in particular, alkylphenol ethoxylates which are frequently used in anti-fog systems (see for example, WO 1995018210).

In general, surface-active coatings based on hydrophilic water-soluble polymers and/or surfactants are used to coat the surfaces of plastic films in order to achieve an antifogging effect. The surfactants can be nonionic, cationic, anionic or zwitterionic in nature, but also polymeric surfactants or protective colloids can be used as anti-fog agents. Further common components for an anti-fog coating are, for example, fatty acid esters and their derivatives, aliphatic alcohols and their esters, polyethoxylated aromatic alcohols, one or more esterified sorbitol esters, monoesterified or esterified glycerol esters, mixed glycerol esters, or e.g. ethoxylated amines. For example, active ingredient combinations from the three classes of substances such as glycerol esters, sorbitol esters and ethoxylated amines are typical. Suitable substances which are used as anti-fog additives are described, for example, in WO 97/22655 A1.

A fundamental problem of water-soluble polymers and/or surfactants is the easy washability of the coating, whereby a permanent antifogging effect cannot be realized.

Conventional polyester films having an anti-fog coating are described in EP 1647568 B1 and EP 1777251 B1. These polyester films have good mechanical properties, but exhibit lower transparency. Furthermore, they have a lower long-term stability under weathering. In addition, the antifogging effect of these polyester films has a short life span of only a few months, since the corresponding anti-fog additives are easily washed off as they are soluble in water, so that the active substance is quickly consumed when used as a greenhouse screen.

EP 1152027 A1, EP 1534776 A1 and EP 2216362 A1 describe polyolefin films based on PVC, LDPE and EVA with long-lasting antifogging properties for food packaging and applications for greenhouse applications using anti-fog additives based on inorganic hydrophilic colloidal substances (colloidal silicon, aluminum and others) and non-ionic, anionic or cationic surface active additives. Although they exhibit permanent antifogging properties, these films have greatly reduced mechanical properties, in contrast to polyester-based greenhouse screens.

It can therefore be concluded that known prior art polyester films are disadvantageous because they do not have a permanent anti-fog coating in combination with high transparency and long-term stability.

SUMMARY

There is therefore a need for a greenhouse screen comprising strips of a polyester film which has permanent anti-fog properties (hereinafter also referred to as antifogging properties) with at the same time high transparency of at least 93%. The polyester film must also have a UV stability of at least 5 years without significantly yellowing and embrittlement or cracking of the surface or a deterioration of the mechanical and optical properties critical to the greenhouse application. In the thickness range of 10 to 40 µm, the film should also be economically produced on existing polyester film systems, such as both single-layer or multi-layer systems.

Viewed from a first perspective the present teachings provides a greenhouse screen comprising strips of film material that are interconnected by a yarn system of transverse and longitudinal threads by means of a knitting, warp-knitting or weaving process to form a continuous product. At least some of the strips comprise a polyester film having a transparency of at least 93%, said polyester film having at least one base layer B comprising a thermoplastic polyester and a UV stabilizer. The polyester film has a first and a second surface, wherein a permanent anti-fog coating is applied to at least one of the first or second surfaces of the polyester film. The anti-fog coating has a lower refractive index than the base layer B.

The greenhouse screens as described herein comprise a plurality of narrow strips of film material held together by a yarn framework. The strips of film material are preferably arranged closely edge to edge, so that they form a substantially continuous surface. The screen has a longitudinal direction, y, and a transverse direction, x, wherein the strips of film material extend in the longitudinal direction. In some embodiments strips of film material may extend also in the transverse direction. A typical width of the strips is between 2 mm and 10 mm.

The film material as disclosed herein has a transparency of at least 93%, such as at least 94%, such as at least 94.5%, at least 95%, or ideally a transparency of at least 95.3% or more. The higher the transparency is, the better the growth of plants in the greenhouse. The high transparency of the greenhouse screen is achieved by using raw materials and particle contents as described below, but mainly the increased transparency is achieved by providing a permanent anti-fog coating to at least one surface of the polyester film.

The polyester film may be a multi-layer film comprising a layer A applied to the base layer B, or a layer A and a layer C applied to the base layer B, the base layer B being located between the layer A and the layer C, and wherein the layers A and/or C comprise a thermoplastic polymer and a UV stabilizer.

Single-layer film strips consist of only a single layer of film which is also called base layer (B-layer). In a single-layer embodiment (mono-foil), the film is represented by the base layer B.

In a multilayer embodiment, the film comprises the base layer and at least one further layer (e.g. A- and/or C-layer) which, depending on its position in the film, is referred to the intermediate layer when at least one further layer is located on each of its two surfaces, or the outer layer, when it forms an outer layer of the film. In the multilayer embodiment, the thickness of the base layer is at least as large as the sum of the thicknesses of the remaining layers. Preferably, the thickness of the base layer is at least 55% of the total film thickness and ideally at least 63% of the total film thickness.

The thickness of the outer layers A and/or C is preferably at least 0.5 micrometers, such at least 0.6 micrometers and ideally at least 0.7 micrometers. The thickness of the outer layers is not more than 3 micrometers such as not more than 2.5 micrometers, and ideally not more than 1.5 micrometers. Below 0.5 micrometers, process stability and the thickness uniformity of the outer layer decreases. From 0.7 micrometers very good process stability is obtained.

The thickness relationship between the base layer B and one or more outer layers A and/or C is important. If the outer layers become too thick or the base layer too thin compared to the total thickness of the film, the cost-effectiveness of the screen decreases, as reclaim (regenerate) originating from the production process have to be added to the base layer. Properties, such as UV-stability and transparency can then also be negatively influenced in the base layer.

The total thickness of the polyester film is at least 10 µm and at most 40 µm, preferably no more than 30 µm. Preferably the film is at least 14 µm and at most 25 µm, such as at least 14.5 µm and at most 20 µm.

If the film thickness is below 10 µm, the mechanical strength of the film is no longer sufficient to accommodate the tension that may arise during use of the greenhouse screen seen in greenhouse applications. Above 40 µm, the film is too stiff and if the film containing screen is collapsed when not in use in the greenhouse, the corresponding cast shadow area becomes too large.

The base layer B consists of at least 70% by weight of a thermoplastic polyester, the thermoplastic polyester comprising at least 85 mol %, preferably at least 90 mol % such as at least 92 mol % units derived from ethylene glycol and terephthalic acid.

The base layer B consists of at least 70% by weight of a thermoplastic polyester, the remaining components being made up of additives such as UV stabilizers, particles, flame retardants, polyolefins, cycloolefin copolymers (COC's) and other additives and/or polyester-compatible polymers, e.g. polyamides. Other additives and/or polyester-compatible polymers (such as, for example, polyamides) are present in an amount of less than 20% by weight, preferably in less than 2% by weight and particularly preferably not at all in the base layer B, or in the layers A and/or C. The use of other additives and/or polymers can lead to an undesired yellowing of the film during the return of the regenerate material during the film-forming process. The consequence of this is that the amount of regenerated material that can be added must be reduced, thereby leading to a reduced economic efficiency. Furthermore, the use of other additives can lead to a deterioration of the mechanical properties of the film.

Suitable polyesters are inter alia polyesters of ethylene glycol and terephthalic acid (=polyethylene terephthalate, PET), ethylene glycol and naphthalene-2,6-dicarboxylic acid (=polyethylene-2,6-naphthalate, PEN), 2,5-furanedicarboxylic acid and ethylene glycol, as well as any mixtures of the carboxylic acids and diols mentioned. Preference is given to polyesters which consist of at least 85 mol %, such as at least 90 mol %, such as ideally at least 92 mol %, of ethylene glycol units and terephthalic acid units. The use of naphthalene-2,6-dicarboxylic acid has no advantages compared to the use of terephthalic acid, and therefore due to the higher price of naphthalene-2,6-dicarboxylic acid is usually not preferred. 2,5-furan dicarboxylic acid is generally not either used because of the higher price. The remaining monomer units are derived from other aliphatic, cycloaliphatic or aromatic diols or dicarboxylic acids.

Suitable aliphatic diols are, for example, diethylene glycol, triethylene glycol, aliphatic glycols of the general formula HO—$(CH_2)_n$—OH, where n is preferably less than 10, cyclohexanedimethanol, butanediol, propanediol, etc. Suitable other dicarboxylic acids are e.g. isophthalic acid, adipic acid, etc. For greenhouse applications it has proven to be advantageous for running stability and weathering stability if the film contains less than 2% by weight, preferably less than 1.5% by weight, of diethylene glycol (based on the total weight of the polyester of the layer) or units derived from diethylene glycol. It has for the same reasons proven advantageous if the base layer B contains less than 12 mol %, preferably less than 8 mol %, and typically less than 5 mol % of isophthalic acid (IPA) with respect to the dicarboxylic acid component of the polyester. It has also been found to be advantageous if the base layer B contains less than 3 mol %, such as less than 1 mol % of CHDM (1,4-cyclohexanedimethanol) with respect to the diol component of the polyester. If the content of the above-mentioned co-monomers, in particular that of CHDM, does not exceed the limits mentioned, the UV stability of the energy-saving screens produced from the film is significantly better than in embodiments in which the limits are exceeded.

Besides the base layer B, also the remaining layers of the film contain the polymer(s) as described above. An exception is the antireflection modification which is applied by co-extrusion to the base layer B opposite to the anti-fog coating as will be described further below. This antireflective coating contains co-monomers in the quantities given below.

For the production of the film as described herein the Standard Viscosity (SV) value of the polyester used is selected in such a way that the film has a SV value greater than 600, such as greater than 650, such as greater than 700, the SV value of the film being less than 950, such as less than 850.

If the SV value is below 600, the film becomes so fragile during manufacture that it breaks too frequently. In addition, in the end applications, a further rapid loss of viscosity occurs with loss of the flexibility of the films with a breaking sequence. In addition, the mechanical strengths mentioned below are no longer reliably achieved with a lower SV value. If the film is to have a higher SV than 950, the polymers used should also have a mean SV of at least 950. These polymers would then remain so tough in the melt in the extruder that excessively high currents would arise during the operation of the extruder electric motors resulting in pressure fluctuations during extrusion, which would lead to a poor running safety.

A film that is to be used in greenhouse applications must have a low transmission in the wavelength range below 370 nm to 300 nm. In this range the light transmission should be less than 40%, preferably less than 30%, and preferably less than 15%. This protects the film from embrittlement and yellowing, as well as the plants and installations in the greenhouse from UV light. Between 390 and 400 nm, the transparency should be greater than 20%, preferably greater than 30%, and particularly preferably greater than 40%, since this wavelength range is photosynthesis-active and plant growth would be adversely affected if transparency is impaired in this wavelength range.

The low UV permeability is achieved by adding an organic UV stabilizer. The UV stabilizer is selected from the group consisting of triazines, benzotriazoles, benzoxazinones. The base layer B and, if present, layer A and/or layer C all contain the UV stabilizer in an amount of 0.3 to 3% by weight, such as 0.75 to 2.8% by weight, based on the weight of the respective layer.

Particular preference is given here to triazines, inter alia, because they have good thermal stability and low outgassing from the film at the processing temperatures of 275-310° C. customary for PET. Particularly suitable is 2-(4,6-diphenyl-1,3,5-triazin-2-yl)-5-(hexyl) oxy-phenol (Tinuvin® 1577). Particular preference is given to 2-(2'-hydroxyphenyl)-4,6-bis (4-phenylphenyl) triazines, marketed by BASF under the brand name Tinuvin 1600™. If these triazines are used, the preferred low transparencies below 370 nm can be achieved even at lower stabilizer concentrations, while at the same time a higher transparency at wavelengths above 390 nm is achieved.

The film, or in the case of a multilayer film, all the film layers contain at least one organic UV stabilizer. UV stabilizers are added to the top layer or mono-film (s) in amounts of between 0.3 and 3% by weight, based on the weight of the respective layer. Particular preference is given to a UV stabilizer content of between 0.75 and 2.8% by weight. The top layers typically contain between 1.2 and 2.5% by weight of UV stabilizer. In the multilayer embodiment of the film, in addition to the outer layers, the base layer preferably also comprises a UV stabilizer, the content of UV stabilizer in wt. % preferably being lower in this base layer than in the outer layer (s). These stated contents in the top layer (s) relate to triazine derivatives. If, instead of a triazine derivative, a UV stabilizer from the group of benzotriazoles or benzoxazinones is used in whole or in part, the replaced portion of the triazine component must be substituted by 1.5 times the amount of a benzotriazole or benzoxazinone component.

In case whitening polymers, which generally are incompatible with the main component polyester, (such as polypropylene, cycloolefin copolymers (COCs), polyethylene, non-crosslinked polystyrene, etc.), are used, they must be added in amounts of less than 0.1% by weight (based on the weight of the film) and preferably not at all, since whitening polymers greatly reduce the transparency and negatively influence the fire behavior of the film. Whitening polymers are also prone to strong yellowing under the influence of UV, and therefore considerable additional amounts of UV stabilizer would be required, which significantly worsens economic efficiency of the greenhouse screen.

The base and cover layer (s) may also contain particles for improving the windability of the screen. Such inorganic or organic particles are calcium carbonate, apatite, silicon dioxide, aluminum oxide, crosslinked polystyrene, crosslinked polymethyl methacrylate (PMMA), zeolites and other silicates such as aluminum silicates, or also white pigments such as $TiO_2$ or $BaSO_4$. These particles are preferably added to the outer layers to improve the windability of the film. When such particles are added, the use of silica-based particles is preferred because they only have a small transparency-reducing effect. The proportion of these or other particles is not more than 3% by weight in any layer, and is preferably less than 1% by weight and more preferably less than 0.2% by weight in each layer (in each case based on the total weight of the respective layer). In the case of a multilayer embodiment, these particles are preferably added to only one, or both outer layers, and will reach the base layer only to a small extent via the regenerate material. Thus, a minimal reduction of the transparency is achieved by the particles required to improve the windability. Preferably, at least one outer layer contains at least 0.07% by weight of these particles.

Since fires in greenhouses are a source of high economic damage, the film must have a reduced flammability. In order to achieve a burning behavior suitable for greenhouse screens, no flame retardants are required if the contents of particles, as well as white pigments and incompatible polymers are within the preferred or better within the particularly preferred ranges as disclosed herein. In these cases the film will reach a grade in the fire test of 4 or lower.

If contents higher than the preferred contents are used in one of the groups mentioned, or if even further reduced fire behavior is required for a particular greenhouse application, it has proven advantageous if the film additionally contains a flame retardant based on organophosphorus compounds. These are preferably esters of phosphoric acid or phosphonic acid. It has proven to be advantageous if the phosphorus-containing compound is part of the polyester (=polymerized). Non-polymerized phosphorus-containing flame retardants, e.g. Adeka rod 700 (4,4'-(isopropylidenediphenyl)bis (diphenylphosphate)) have, besides the disadvantage of an outgassing of the flame retardant during production, a very strong adverse effect on the hydrolysis stability of the film, i.e. of the polyester, so that a rapid embrittlement of the film occurs in the humid and warm greenhouse climate and the greenhouse screens have to be replaced more often.

These effects are significantly reduced by the use of phosphorus compounds incorporated into the polyester chain. The phosphorus may be part of the main chain, e.g. when using 2-carboxyethyl-methylphosphinic acid (other suitable compounds which are described, for example, in DE-A-23 46 787). However, particular preference is given to phosphorus compounds in which the phosphorus is located in a side chain, since the hydrolysis is less under greenhouse conditions. Such compounds are preferably compounds of the following formula (I):

wherein
$R^1$ is an ester-forming group selected from —$COOR^4$, —$OR^5$ and —$OCOR^6$,
$R^2$ and $R^3$ are independently selected from halogen atoms, hydrocarbon groups with 1-10 carbon atoms and $R^1$
$R^4$ is hydrogen or a carbonyl group or a hydrocarbon group with 1-10 carbon atoms which may contain an OH group or carboxyl group,
$R^5$ is hydrogen or a hydrocarbon group with 1-10 carbon atoms which may contain an OH group or carboxyl group,
$R^6$ is a hydrocarbon group having 1-10 carbon atoms which may contain an OH group or carboxyl group,
A is a divalent or trivalent hydrocarbon group with 1-8 carbon atoms,
$n_1$ is 1 or 2, and
$n_2$ and $n_3$ are each 0, 1, 2, 3 or 4, in particular wherein said compound of formula (I) having two ester-forming functional groups.

Particularly suitable is 6-oxo-dibenzo [c, e]-[1,2] oxaphosphorin-6-ylmethyl-succinic acid-bis (2-hydroxyethyl) ester (CAS No. 63562-34-5.). Using this monomer in the production of polyester to give polymers having a relatively low susceptibility to hydrolysis also enables a film production process with good operational reliability.

When the monomer 6-oxo-dibenzo-[c, e]-[1,2] oxaphosphorin-6-yl-methyl-succinic acid bis (2-hydroxyethyl) ester (CAS No. 63562-34-5) is used in the polyester preparation, polymers with a polymerized flame retardant and with a comparatively low level of hydrolysis are obtained, which can be processed in film production with good running stability.

The higher the proportion of phosphorus becomes, the lower the rate of combustion and burning of the greenhouse becomes, but these advantages come at the cost of lower hydrolysis stability. For this reason the quantity of flame retardant is adjusted such that the proportion of phosphorus in the film is at least 500 ppm, preferably at least 1200 ppm, and typically at least 1600 ppm. The proportion of phosphorus is less than 5000 ppm, preferably less than 4000 ppm, and typically less than 3000 ppm (ppm), based on the respective weights of all the components used (not on the molar mass). With these amounts of phosphorus film decomposition by hydrolysis is not expected within several years of use.

The phosphorus content can be evenly or differently distributed over the layers. However, it has been found to be advantageous if the outer layers contain at least 75% of the phosphorus concentration of the inner layer (s), preferably they contain the same phosphorus concentration, and the top layers preferably contain at least 5% more phosphorus than the base layer. This leads to a particularly favorable fire behavior and a generally lower amount of phosphine is required.

Coatings and Topcoat Layer Modifications

In order to achieve the transparency of at least 93%, such as 94%, such as 94.5% and ideally 95% for the films as described herein, the uncoated biaxially oriented polyester film must have a transparency of at least 91%, and at least on one side be provided with an anti-fog coating.

In one embodiment, the polyester film is provided on one side with an anti-fog coating, which at the same time contributes to a transparency increase (acts as an antireflection modification). With this embodiment, the minimum and preferred transparency values of 93% are achieved.

The anti-fog coating described below must have a lower refractive index than the polyester film. The refractive index of the anti-fog coating is below 1.64, preferably below 1.60 and ideally below 1.58 at a wavelength of 589 nm in the machine direction of the film.

Furthermore, the thickness of the anti-fog coating must be at least 60 nm and at most 150 nm, preferably at least 70 nm and at most 130 nm, particularly preferably at least 80 nm and at most 120 nm.

This results in an ideal transparency increase in the desired wavelength range. Below a layer thickness of 60 nm, the anti-fog coating no longer contributes to the transparency increase. However, at a layer thickness of at least 30 nm, the permanent anti-fogging properties are retained. If the layer thickness of maximum 150 nm is exceeded, a further increase in thickness of the anti-fog coating does not lead to any further transparency increase. Furthermore, because of the higher coating material consumption, the cost-effectiveness of the film is reduced.

The addition of an anti-fog coating achieves the permanent anti-fog effect. However, in order to achieve the transparency values of at least 93%, a screen according to this embodiment must have an anti-fog coating applied to the first or second surface of the polyester film, and the surface of the polyester film facing the anti-fog coating should be provided with an antireflection modification layer which is either an anti-reflective coating, or is formed by an topcoat layer modification.

This antireflection modification layer, which is formed either by an anti-reflective coating, or a topcoat layer modification must have a lower refractive index than polyethylene terephthalate. If the antireflection modification layer is represented by an anti-reflective coating, this coating has a lower refractive index than the polyester film. The refractive index at a wavelength of 589 nm in the machine direction of the anti-reflective coating is thereby below 1.64, preferably below 1.60 and ideally below 1.58. In this embodiment, the anti-fog coating on the opposite side of the film has a thickness of at least 30 nm and preferably at least 40 nm and particularly preferably at least 50 nm and at most 60 nm.

Particularly suitable copolymers to be used in anti-reflective coatings are polyacrylates, silicones and polyurethanes, as well as polyvinyl acetate. Suitable acrylates are described, for example, in EP-A-0144948 and suitable silicones are described, for example, in EP-A-0769540. Particular preference is given to coatings based on acrylate, since these do not tend to sweep out coating components or peel off parts of the coating in the greenhouse, which is far more the case with silicone-based coatings. Preferably, the coating contains copolymers of acrylate and silicone.

In one embodiment the anti-reflective coating contains more than 70 wt. % methyl methacrylate and ethyl acrylate, particularly preferably more than 80 wt. % methyl methacrylate and ethyl acrylate, and ideally more than 93 wt. % of methyl methacrylate and ethyl acrylate repeating units. In one embodiment, more than 50 wt. % of the anti-reflective coating contains methyl methacrylate repeating units.

In a further embodiment, the anti-reflective coating contains less than 10 wt. %, particularly preferably less than 5 wt. %, and ideally less than 1 wt. % repeating units containing an aromatic structure element. Above 10 wt. % content of repeating units having an aromatic structural element there is a significant deterioration in weathering resistance of the coating.

The anti-reflective coating particularly preferably comprises at least 1% by weight (based on the dry weight) of a UV stabilizer. Particular preference being given here to Tinuvin 479 or Tinuvin 5333-DW. Less preferred are HALS (hindered amine light stabilizers), since these lead to a clear yellowing of the material during the regeneration (return of film residues from the production) and therefore to a reduction of the transparency. Further, the anti-reflective coating may be an acrylate-silicone copolymer or a polyurethane (e.g., NeoRez® R-600 from DSM Coating Resins LLC) and another UV stabilizer.

The thickness of the anti-reflective coating is at least 60 nm, preferably at least 70 nm and in particular at least 80 nm, and is at most 130 nm, preferably at most 115 nm, and ideally at most 110 nm. This achieves an ideal transparency increase in the desired wavelength range.

In one embodiment, the thickness of the anti-reflective coating is greater than 87 nm, and more preferably greater than 95 nm but the thickness of the coating is preferably less than 115 nm and is typically less than 110 nm.

In this narrow thickness range, the transparency increase is close to the optimum while the reflection of the UV and blue range of light is increased compared to the rest of the visible spectrum. This, on the other hand, saves UV stabilizer, but above all causes the blue/red ratio of light to shift in favor of the red portion. This results in improved plant growth, increased flowering and fruit development.

If the antireflection modification is formed by a topcoat layer modification, the topcoat layer modification is formed by co-extrusion onto the base layer B, wherein the topcoat layer modification comprises a polyester which has a lower refractive index than the polyester of the base layer B.

The refractive index at a wavelength of 589 nm in the machine direction of the topcoat layer provided by co-extrusion is below 1.70, preferably below 1.65 and particularly preferably below 1.60.

The polymer of the topcoat layer modification contains a co-monomer fraction of at least 2 mol %, preferably at least 3 mol % and particularly preferably at least 6 mol %.

Below 2 mol %, the values desired for the refractive index cannot be achieved. The co-monomer content is below 20 mol %, such as below 18 mol %, such as below 16 mol %. Above 16 mol %, the UV stability is significantly poorer due to the amorphous nature of the layer and above 20 mol %, the same level of UV stability can no longer be achieved with more UV stabilizer as below 16 mol %.

Co-monomers used are all monomers except ethylene glycol and terephthalic acid (or dimethyl terephthalate). The share of co-monomer as described herein always refers to the sum of all co-monomers. Preferably no more than two co-monomers are used simultaneously. Isophthalic acid is particularly preferred as the co-monomer as the presence of IPA in the outer layers serves to increase the transparency of the film.

Preferably, the topcoat layer modification provided by co-extrusion comprises more than 8 mol % IPA and more preferably more than 10 mol % IPA, but less than 20 mol % preferably less than 19 mol % and more preferably less than 15 mol % (In each case with regard to the dicarboxylic acid component of the polyester).

A layer with a co-monomer content greater than 8 mol % (based on the polyester in this layer, or on its dicarboxylic acid component) also advantageously contains at least 1.5% by weight and particularly preferably more than 2.1% by weight of organic UV stabilizer, based on the total weight of the layer, in order to compensate for the poorer UV stability of layers having an increased co-monomer content.

In one embodiment, one film surface has an anti-fog coating with a thickness of at least 60 nm, preferably at least 70 nm and in particular at least 80 nm, and is at most 150 nm, preferably at most 130 nm and typically at most 120 nm.

The refractive index of the anti-fog coating at a wavelength of 589 nm in the machine direction of the film is below 1.64, preferably below 1.60 and is typically below 1.58. The film surface opposite the anti-fog coating is provided with an antireflection modification, formed as already described above. As a result, the particularly preferred transmittance values of at least 94.5% and the ideal transparency values of 95% can be achieved particularly easily. These films exhibit very good results in the cold-fog and hot-fog test with very high transparency and are therefore particularly suitable for a multi-year use in the greenhouse.

In a further embodiment, both the first and second surfaces of the polyester film are provided with anti-fog coatings. In this embodiment both anti-fog coatings have a thickness of at least 60 nm, preferably at least 80 nm and at most 150 nm, preferably a maximum of 130 nm and an ideal maximum of 120 nm. The refractive index of the anti-fog coatings at a wavelength of 589 nm in the machine direction of the film is below 1.64, preferably below 1.60 and is typically below 1.58. The preferred transparency values of at least 94.5% can be achieved by providing an anti-fog coating on both sides. Owing to the use of a single coating composition, high-transparency films with very good permanent anti-fog properties (cold-fog and hot-fog test) can be achieved. This film is particularly suitable in greenhouses with a continuously high humidity (condensation), since the formation of water droplets on both surfaces of the film can be avoided by the two-sided anti-fog coating, thus minimizing the loss of transparency due to water droplet formation. Furthermore, also the lensing effect of water droplets is reduced.

In order to achieve the high permanent anti-fog effect as described herein, the film must be equipped with a permanent anti-fog coating at least on one side. The good anti-fogging properties of the surface are obtained when the formation of fine water droplets (for example, condensation in the greenhouse) is not observed on the surface of the polyester film and, while at the same time, the washing resistance of the coating is good. A minimum requirement for good anti-fogging properties is a high surface tension or a low contact angle (see method section). The anti-fogging properties are sufficiently good if the surface tension of the anti-fog surface is at least 46 mN/m, such as at least 48 mN/m, such as at least 55 mN/m.

A permanent anti-fog effect can be achieved for a period of at least one year in the cold fog test and for at least three months in the hot fog test (desired ratings A and B, see method part or sample table). By using the coating composition described herein, permanent anti-fogging properties and a transparency of at least 93% are achieved. In the case of a multilayer embodiment with an antireflection modification such as a coextruded topcoat layer modification, the permanent anti-fog coating of the antireflex-modified Coex layer is applied to the opposite side of the film.

The anti-fog coating composition as used herein is a dispersion and comprises, in addition to water (continuous phase), the following components (disperse phase):
 a) a hygroscopic, porous material;
 b) a polymer-based crosslinker;
 c) an adhesion-promoting organofunctional silane; and
 d) one or more surfactants.

The anti-fog coating is formed by drying the coating composition. The coating is applied homogeneously with application weights between 1.0 and 3.0 g/m² (wet application). To prepare the coating dispersion, the components a)-d) can be initially introduced either dry or pure (i.e., in a non-dissolved or non-dispersed state) and then dispersed in the aqueous medium, or in each case pre-dispersed or dissolved individually in the aqueous medium, and subsequently mixed and, if appropriate, diluted with water. If the components a)-d) are each individually dispersed or dissolved, it has been found to be advantageous if the resulting mixture is homogenized with a stirrer for at least 10 min before it is used. If the components a)-d) are used in a pure form (i.e., in a non-dissolved or non-dispersed state), it has proven to be particularly advantageous if high shear forces are applied during the dispersion by the use of corresponding homogenization processes.

The non-aqueous portion of the dispersion is preferably in the range from 2 to 20% by weight and particularly preferably in the range from 5 to 18% by weight.

The hygroscopic porous material (i.e. component a)) is advantageously chosen from inorganic and/or organic particles such as amorphous silica, inorganic alkoxides containing silicon, aluminum or titanium (as described in DE 69833711), kaolin, crosslinked polystyrene or acrylate particles. The use of inorganic alkoxides, crosslinked polystyrene or acrylate particles have proven disadvantageous since a negative influence on the antifogging properties could be observed. Preference is given to using porous $SiO_2$, such as amorphous silica, and aluminum silicates (zeolites). Furthermore, $SiO_2$ nanoparticles can be used additionally or exclusively in order to increase the wettability of the film surface, as well as to absorb enough water, so that a homogeneous water film is formed and thus an anti-fogging effect is produced. Elecut AG 100 from Takemoto Oil and Fat Co. Ltd. (Japan) is particularly suitable here. Component a) is used in a concentration of 1.0 to 6.5% by weight, such as in a concentration of 1.5 to 6.0% by weight.

A crosslinking polymer, an acrylate, hydrophilic polyester, polyurethane, or an oxazoline-functionalized acrylate polymer is used as a polymer-based crosslinker (component b) in an amount of 0.5 to 6.0% by weight, such as in an amount of 1.0 to 5.0% by weight. In one embodiment, the EPOCROS WS-500, and in particular the EPOCROS WS-700, by Nippon Shokubai is used.

As adhesion-promoting organofunctional silane (i.e. component c) it is possible to use vinyltrimethoxysilane, vinyltriethoxysilane, γ-meth-acryloxy-propyltrimethoxysilane or γ-glycidoxypropyltrimethoxysilane, in a concentration of from 0.1 to 1.0% by weight, such as from 0.2 to 0.7% by weight. The Z-6040 silane, a gylcidoxypropyltrimethoxysilane from Dow Corning may be used for an improved adhesion promoter.

The surfactant d) mentioned in the above-described coating composition is used in a concentration of 1.5 to 7.0% by weight, such as 2.0 to 6.5% by weight, and is either an ionic, but preferably an anionic surfactant from the group of alkyl sulfates, alkyl benzene sulfates or sulfosuccinic acid esters. Surfactants selected from the group of sulfosuccinic acid esters (sodium dioctyl sulfosuccinate) or nonionic surfactants, e.g. Polysorbate 80 (polyoxyethylene (20) sorbitan monooleate), e.g. Tween 80 (Sigma Aldrich), or Elecut AG 200 from Takemoto Oil and Fat Co. Ltd. (Japan) are used. By the addition of a further surfactant of 0.01 to 0.08% by weight, such as 0.02 to 0.07% by weight, based on alcohol alkoxylates, e.g. under the trade name BYK-DYNWET 800 from BYK-Chemie, or Sufynol 440 from Air Products, the surface finish of the coating can be improved by using an in-line application process.

Above the limits as disclosed herein, the dispersion achieves an excessively high viscosity so that the coating can no longer be applied homogeneously with the general coating methods. In addition, the efficiency of the film decreases due to the use of an excess of coating components. Below the limits described herein, the desired anti-fogging properties appear only to a limited extent (not permanently), since the desired coating thickness is too low.

By maintaining the limits disclosed herein, the reaction product of the coating dispersion, especially on a biaxially oriented polyester film, provides a good antifouling effect, a high wash-off resistance and a high hydrophilicity.

According to one embodiment, the anti-fog and/or anti-reflective coating is applied in-line during the production process of the biaxially oriented polyester film.

The application of the coating (permanent anti-fog coating) or of the coatings (anti-fog coating and anti-reflective coating) takes place on one side or on both sides subsequent to the longitudinal and transverse stretching of the polyester film. In order to achieve good wetting of the polyester film with the aqueous-based coatings, the film surface (s) is/are preferably first corona-treated.

The coating (s) can be applied by a common suitable method such as a slot caster or a spraying process. Particular preference is given to the application of the coating (s) by means of the reverse gravure roll coating method, in which the coating (s) can be applied very homogeneously. The application by the Meyer-Rod method, with which larger coating thicknesses can be achieved, is also preferred. The coating components can react with one another during the drying and stretching of the polyester film and particularly during the subsequent heat treatment, which can reach up to 240° C. The in-line process is more attractive in terms of efficiency since the anti-fog and anti-reflective coatings can be applied simultaneously with a two-sided coating method so that one process step (see off-line method below) can be saved.

In another preferred method, the above-described coatings are applied by off-line technology. The anti-reflective and/or anti-fog coatings as described herein may be applied to the corresponding surfaces of the polyester film by means of off-line technology in an additional process step downstream of the film production, using a gravure roller.

The maximum limits are determined by the process conditions and the viscosity finds its upper limit in the processability of the coating dispersion. It has been found to be unfavorable to apply the anti-fog coating to an undercoating (anti-fog coating on an anti-reflective coating) because on the one hand the material consumption increases and on the other hand a further process step is required, which reduces the economic efficiency of the film.

In some in-line coating methods, the particularly preferred coating thicknesses cannot be achieved due to the high viscosity of the coating dispersion. In this case, it is appropriate to choose the off-line coating process, since dispersions with lower contents of solids and higher wet application rates can be processed using this method, resulting in a simpler processability. In addition, higher coating thicknesses can be achieved in the case of off-line coatings, which have proven to be advantageous in applications which have a high demand for the long lifetime of the anti-fogging. Thus, the off-line process makes it possible to achieve coating thicknesses of 80 nm in a particularly simple manner, as a result of a better permanent anti-fog effect, but no further increase in transparency.

Further Film Characteristics

The film as described herein and produced according to the above-described process preferably has a shrinkage in the longitudinal and transverse directions of less than 5%, such as below 2%, such as below 1.5%, at 150° C. This film also has an expansion of less than 3%, such as less than 1%, such as less than 0.3% at 100° C. This shape stability can be obtained, for example, by suitable relaxation of the film before winding (see process description). This form stability is important in order to avoid re-shrinking of the strips, which would lead to increased air passage between the strips (reduction of the screening effect) when used in greenhouse applications. Excessive shrinkage as well as an excessive expansion, leads to a wave-like stretching of the finished products.

The film as described herein also has an E-modulus in the longitudinal direction and in the transverse direction in both directions of the film that is greater than 3000 N/mm$^2$ such as greater than 3500 N/mm$^2$, and particularly in at least one film direction >4500 N/mm$^2$. The F5 values (force at 5% elongation) are advantageously greater than 80 N/mm$^2$ in the longitudinal and transverse directions, such as above 90 N/mm$^2$. These mechanical properties can be adjusted and obtained by varying the parameters of the biaxial stretching of the film in the context of the above-mentioned process conditions. Films with the stated mechanical properties are not excessively stretched in the application under tension and remain readily manageable.

In order to achieve the transparency values as disclosed herein, it has also been found to be advantageous if the opacity of the film is less than 20%, such as less than 18% and ideally less than 15%. The lower the turbidity, the less is the back-scattering of light and thus the loss of transparency. When the particle contents and polymer composition as described herein are maintained, these turbidity values are achieved.

Films as described herein are outstandingly suitable for the production of screens in greenhouses. Here, the film is usually cut into narrow strips with a width of 2-10 mm, from which then together with polyester yarn (also this must be UV stabilized) a fabric or screen is produced, which is hung in the greenhouse. The strips of the film described herein can be combined with strips of other films. Such strips may be of materials providing desired heat transporting and shading properties and be of plastic film, metal foil or laminates of plastic and metal.

One or more of said strips of film material may have a width that is smaller than the distance between the longitudinal threads. It is also possible to make a screen having "open" areas free from strips permitting ventilation through said screen.

In order to provide the desired antifogging properties at least 10%, such as at least 20%, such as at least 30%, such as at least 40%, such as at least 50%, such as at least 60%, such as at least 70%, such as at least 80%, such as at least 90% of the surface area of the screen should be strips of the single or multilayer film as described herein.

According to one embodiment all strips in the screen are of the single or multilayer polyester film described and the strips are arranged closely edge to edge, so that they form a substantially continuous surface.

In some embodiments the strips of the film described herein may be interconnected by a yarn framework having liquid-transporting capacity by capillary action. Advantageously the yarn framework is thermally bonded to at least one side of the strips of film material, and wherein also those parts of the yarn framework that are thermally bonded to the strips have liquid-transporting capacity by capillary action.

In one embodiment the greenhouse screen as described herein may be used as a highly transparent convection barrier. Alternatively, the film itself is installed in the greenhouse.

BRIEF DESCRIPTION OF THE DRAWINGS

The greenhouse screen will below be described with reference to some embodiments shown in the drawings.

DETAILED DESCRIPTION

The greenhouse screen 10 according as disclosed herein comprises a plurality of narrow strips of film material 11 held together by a yarn framework 12, 13a, 13b; 14, 15; 18, 19.

The strips of film material 11 are preferably arranged closely edge to edge, so that they form a substantially continuous surface. The screen has a longitudinal direction, y, and a transverse direction, x, wherein the strips of film material 11 extend in the longitudinal direction. In some embodiments strips of film material 11' may extend also in the transverse direction. A typical width of the strips is between 2 mm and 10 mm.

Figure 1:
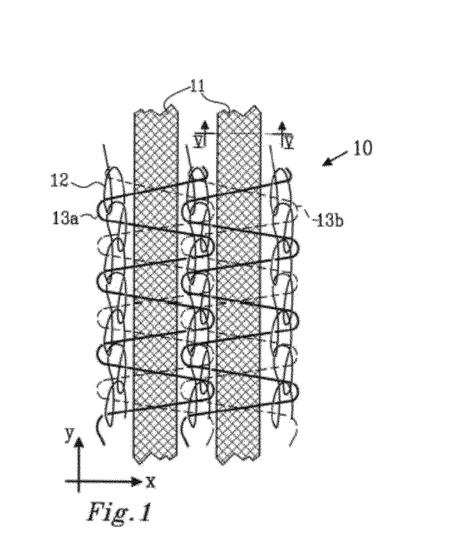
FIG. 1 shows on an enlarged scale part of warp-knitted screen according to one embodiment.

In FIG. 1 strips of film material 11 are interconnected by a warp knitting procedure as described in EP 0 109 951. The yarn framework comprises warp threads 12 forming loops or stitches and primarily extending in the longitudinal direction, y. The warp threads 12 are connected to one another by weft threads 13a and 13 b extending across the film strips.

FIG. 1 shows an example of a mesh pattern for a fabric manufactured through a warp knitting process in which four guide bars are used, one for the strips of film material 11, two for the connecting weft threads 13a and 13b extending transversely to the film strips and one for the longitudinal warp threads 12.

The spaces between the strips of film material 11 have been strongly exaggerated in order to make the mesh pattern clear. Usually the strips of film material 11 are located closely edge to edge. The longitudinal warp threads 12 are arranged on one side of the screen, the underside, while the transverse connecting weft threads 13a and 13b are located on both sides of the fabric, the upper and the underside. The term "transverse" in this respect is not restricted to a direction perpendicular to the longitudinal direction, but means that the connecting weft threads 13a and 13b extends across the strips of film material 11 as illustrated in the drawings. The connection between the longitudinal warp threads 12 and the transverse weft threads 13a and 13b are preferably made on the underside of the fabric. The strips of film material 11 can in this way be arranged closely edge to edge without being restricted by the longitudinal warp threads 12.

The longitudinal warp threads 12 in FIG. 1 extend continuously in unbroken fashion along opposite edges of adjacent strips of film material 11, in a series of knitted stitches, in a so called open pillar stitch formation.

The transverse weft threads 13a and 13b pass above and below the strips of film material 11 at the same location, i.e. opposed to each other, to fixedly trap the strips of film material. Each knitted stitch in the longitudinal warp threads 12 has two such transverse weft threads 13a and 13b engaging with it.

Figure 2:
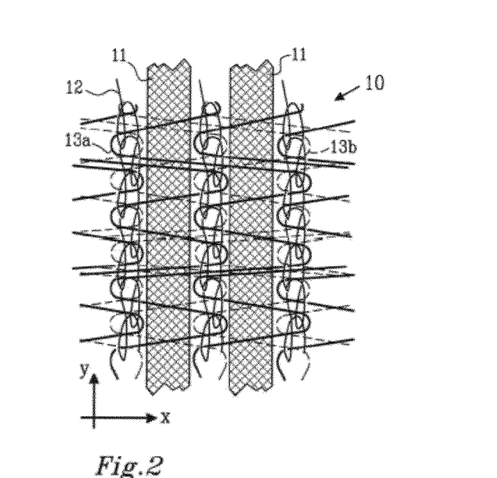
FIG. 2 shows a part of a warp-knitted screen according to a further embodiment.

FIG. 2 shows another example of a mesh pattern for a fabric similar to the one shown in FIG. 1. The difference is that the transverse weft threads 13a and 13b pass over one and two strips of film material 11 in an alternating way.

Figure 3:
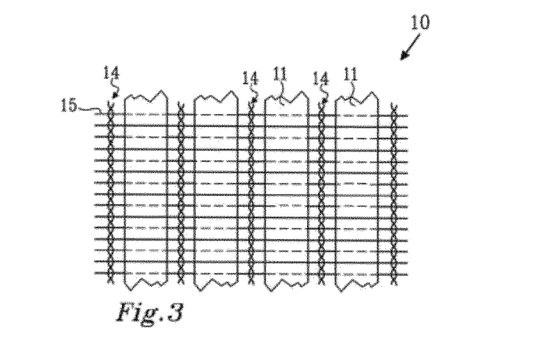
FIG. 3 shows on an enlarged scale a part of a woven screen.

FIG. 3 shows a woven screen in which the strips of film material 11 are interconnected by warp threads 14 extending in longitudinal direction, y, and interwoven with weft threads 15 extending across the strips of film material 11 primarily in the transverse direction, x.

Figure 4:
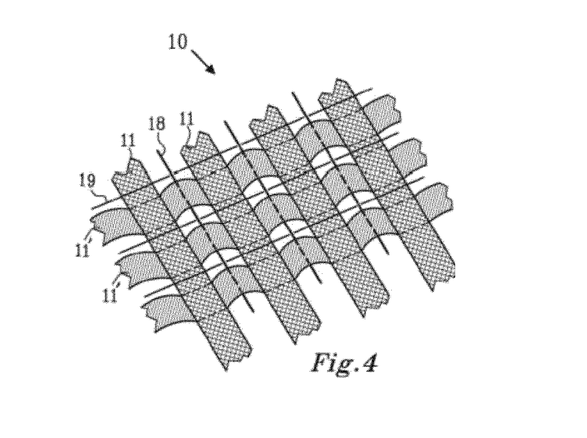
FIG. 4 shows a part of a woven screen according to a further embodiment.

FIG. 4 shows another embodiment of a woven screen as described in U.S. Pat. No. 5,288,545 comprising strips of film material 11 (warp strips) extending in longitudinal direction, y, and strips of film material 11' (weft strips) extending in transverse direction, x. The weft strips 11' in the transverse direction may as shown in FIG. 4 always be on the same side of the warp strips 11 in longitudinal direction or may alternate on the upper and underside of the warp longitudinal strips 11. The warp and weft strips 11 and 11' are held together by a yarn framework comprising longitudinal and transverse threads 18 and 19. The screen may comprise open areas that are free from strips to reduce heat build-up under the screen.

Polyester Film Production Process

The polyester polymers of the individual layers are prepared by polycondensation, either from dicarboxylic acids and diol or else from the esters of the dicarboxylic acids, preferably the dimethyl esters, and diol. Suitable polyesters preferably have SV values in the range from 500 to 1300, the individual values being less important, but the average SV value of the raw materials used must be greater than 700 and such as greater than 750.

The particles, as well as UV stabilizers, can already be added during the preparation of the polyester. For this purpose, the particles are dispersed in the diol, optionally ground, decanted and/or filtered and added to the reactor, either in the (Re) esterification or polycondensation step. Preferably, a concentrated particle-containing or additive-containing polyester masterbatch can be produced in a twin-screw extruder and thereafter diluted during the film extrusion with particle-free polyester. It has proven to be advantageous if no masterbatches are used which contain less than 30% by weight of polyester. In particular, the masterbatch containing $SiO_2$ particles should not be more than 20% by weight of $SiO_2$ (as a result of the risk of gel formation). A further possibility is to add particles and additives directly during the film extrusion in a twin-screw extruder.

When single-screw extruders are used, it has been found to be advantageous to dry the polyesters beforehand. When a twin-screw extruder with a degassing zone is used, the drying step can be dispensed with.

First, the polyester or the polyester mixture of the layer or in the case of multilayer films of the individual layers is compressed and liquefied in extruders. The melt is then formed into flat melt films in a single-layer or multi-layer nozzle, pressed through a slot die and drawn off on a cooling roll and one or more take-off rolls, where it cools and solidifies.

The film as described herein is biaxially oriented, that is, biaxially stretched. The biaxial stretching of the film is most frequently carried out sequentially. In this case, it is preferably first stretched in the longitudinal direction (i.e., in the machine direction, MD direction) and subsequently in the transverse direction (i.e., perpendicular to the machine direction, TD direction). The stretching in the longitudinal direction can be carried out with the aid of two rollers running at different speeds according to the desired stretching ratio. For transverse stretching, a corresponding tenter frame is generally used.

The temperature at which the stretching is carried out can vary within a relatively wide range and depends on the desired properties of the film. In general, the longitudinal stretching is carried out in a temperature range from 80 to 130° C. (heating temperatures 80 to 130° C.) and in the transverse direction in a temperature range from 90° C. (beginning of stretching) to 140° C. (end of stretching). The longitudinal stretching ratio is in the range from 2.5:1 to 4.5:1, such as from 2.8:1 to 3.4:1. A stretching ratio above 4.5 leads to a markedly deteriorated manufacturability (tear-off). The transverse stretching ratio is generally in the range from 2.5:1 to 5.0:1, such as from 3.2:1 to 4:1. A higher cross-draw ratio than 4.8 leads to a markedly deteriorated manufacturability (tear-off) and should therefore preferably be avoided.

In order to achieve the desired film properties, it has proven to be advantageous if the stretching temperature (in MD and TD) is below 125° C., such as below 118° C. Prior to the transverse stretching, one or both surfaces of the film can be coated in-line according to the processes known per se. The in-line coating can preferably be used for applying a coating for increasing the transparency (antireflex).

In the subsequent thermofixing, the film is held under tension at a temperature of 150 to 250° C. for a period of time of about 0.1 to 10 seconds, in order to achieve the preferred shrinkage and elongation values of at least 1%, such as at least 3%, such as at least 4% in the transverse direction. This relaxation preferably takes place in a temperature range from 150 to 190° C. To reduce the transparency bow, the temperature in the first fixing field is preferably below 220° C., and more preferably below 190° C. In addition, for the same reason as stated above, at least 1%, preferably at least 2%, of the total transverse stretching ratio should be in the first fixing field after which it is usually not stretched any further. Subsequently, the film is wound up in a conventional manner.

In a particularly economical way of producing the polyester film, the blended material (regenerate) can be fed to the extrusion in an amount of up to 60% by weight, based on the total weight of the film, without adversely affecting the physical properties of the film.

The greenhouse screen is explained in more detail below with reference to the following:

Examples 1-9, and

Comparative Examples 1-7

The exemplary embodiments serve to further illustrate the greenhouse screen as disclosed herein, without restricting it to this. Rather, all of the features mentioned are freely combinable in any form which appears suitable for a person skilled in the art, and all of these forms are encompassed by the present greenhouse screen as disclosed herein.

Examples 1-9

The polymer mixtures were melted at 292° C. and electrostatically applied to a cooling drum heated to 50° C. by means of a slot die. The following raw materials were melted in one extruder per layer and extruded through a three-layered slot die onto a cooled take-off roll. The amorphous preform thus obtained was then stretched longitudinally. The longitudinally stretched film was corona-treated in a corona discharger and then coated by reverse-coating with the following dispersion. Thereafter, the film was stretched, fixed, and rolled. The conditions in the individual process steps were as seen in Table 1:

TABLE 1

| Longitudinal stretching (MD) | Heating temperature | 75-115 | ° C. |
|---|---|---|---|
| | Stretching temperature | 115 | ° C. |
| | Longitudinal stretching ratio | 3.8 | |
| Transverse stretching (TD) | Heating temperature | 100 | ° C. |
| | Stretching temperature | 112 | ° C. |
| | Transverse stretching ratio (including Stretching in first fixing field) | 3.9 | |
| Fixation | Temperature | 237-150 | ° C. |
| | Duration | 3 | s |
| | Relaxation in TD at 200-150° C. | 5 | % |
| Fixation | Temperature in first fixing field | 170 | ° C. |

The following starting materials were used to prepare the films described in table 2 below:

PET1=polyethylene terephthalate raw material of ethylene glycol and terephthalic acid with an SV value of 820 and DEG content of 0.9% by weight (diethylene glycol content as monomer).

PET2=polyethylene terephthalate raw material having an SV value of 700 containing 20% by weight of Tinuvin® 1577. The UV stabilizer has the following composition 2-(4,6-diphenyl-1,3,5-triazyn-2-yl)-5-(hexyl) oxy-phenol (Tinuvin® 1577 from BASF, Ludwigshafen, Germany). Tinuvin® 1577 has a melting point of 149° C. and is thermally stable at 330° C.

PET3=polyethylene terephthalate raw material having an SV value of 700 and 15% by weight of silica particles Sylysia310 P with a d50 of 2.7 µm (manufacturer FUJI SILYSIA CHEMICAL LTD. Greenville NC/USA). The $SiO_2$ was incorporated into the polyethylene terephthalate in a twin-screw extruder PET4=polyethylene terephthalate raw material having an SV value of 710 containing 25 mol % of isophthalic acid as comonomer.

Composition of the Coating Dispersions Used

Coating 1

The following composition of the coating solution was used:

88.95% by weight of deionized water 3.50% by weight of Elecut AG 100 (16.5% by weight, Takemoto Oil and Fat Co. Ltd.)

4.50% by weight of Elecut AG 200 (13.5% by weight, Takemoto Oil and Fat Co. Ltd.)

2.50% by weight of EPOCROS WS-700 (25% by weight, Nippon Shokubai)

0.50% by weight of Z-6040 (90-100% by weight, Dow Corning)

0.05% by weight of BYK-DYNWET 800 (100% by weight, BYK-Chemie GmbH)

The individual components were slowly added to deionized water with stirring and stirred for at least 30 minutes before use.

Coating 2

The following composition of the coating solution was used:

88.45% by weight of deionized water 2.50% by weight of Elecut AG 100 (16.5% by weight, Takemoto Oil and Fat Co. Ltd.)

3.50% by weight of Elecut AG 200 (13.5% by weight, Takemoto Oil and Fat Co. Ltd.)

5.00% by weight of EPOCROS WS-700 (25% by weight, Nippon Shokubai)

0.50% by weight of Z-6040 (90-100% by weight, Dow Corning)

0.05% by weight of BYK-DYNWET 800 (100% by weight, BYK-Chemie GmbH)

The individual components were slowly added to deionized water with stirring and stirred for at least 30 minutes before use. Unless otherwise described, the coatings are applied in the in-line process.

The following Table 2 summarizes the formulations, production conditions and resulting film properties:

TABLE 2

Properties for films in Examples 1-9

| | | Example 1 | Example 2 | Example 3 | Example 4 | Example 5 |
|---|---|---|---|---|---|---|
| Layer (μm) | Film thickness | 15 | 15 | 15 | 15 | 15 |
| | Thickness layer A | 0.8 | 0.8 | 0.8 | 0.8 | 0.8 |
| | Thickness layer B | 13.4 | 13.4 | 13.4 | 13.4 | 13.4 |
| | Thickness layer C | 0.8 | 0.8 | 0.8 | 0.8 | 0.8 |
| | Coating on surface A | Dry thickness 65 nm. Anti-fog coat. 1 | Dry thickness 65 nm. Anti-fog coat. 2 | Dry thickness 65 nm. Anti-fog coat. 2 | Dry thickness 65 nm. Anti-fog coat. 1 | Dry thickness 65 nm. Anti-fog coat. 1 (off-line proc.) |
| | Coating on surface C | | | | Dry thickness 75 nm. Acrylate coat. and application method as in example 1 of EP 0144948 | |
| A-layer | PET 1 | 89 | 89 | 89 | 89 | 89 |
| | PET 2 | 10 | 10 | 10 | 10 | 10 |
| | PET 3 | 1 | 1 | 1 | 1 | 1 |
| | PET 4 | | | | | |
| B-layer | PET 1 | 95 | 95 | 95 | 95 | 95 |
| | PET 2 | 5 | 5 | 5 | 5 | 5 |
| C-layer | PET 1 | 34 | 34 | 89 | 89 | 34 |
| | PET 2 | 15 | 15 | 10 | 10 | 15 |
| | PET 3 | 1 | 1 | 1 | 1 | 1 |
| | PET 4 | 50 | 50 | | | 50 |
| Transparency (web center) | in % | 93.2 | 93.8 | 93.0 | 95.0 | 94.0 |
| Haze | | 10.5 | 9.8 | 13.0 | 13.0 | 15.5 |
| UV-stability UTS | in % | 70 | 64 | 65 | 65 | 64 |
| Flame test | Grade | 4 | 4 | 4 | 4 | 4 |
| E-Modul MD Young's Modulus MD | N/mm² | 4360 | 3950 | 3950 | 3950 | 4000 |
| E-Modul TD Young's Modulus TD | N/mm² | 4800 | 4350 | 4300 | 4300 | 4500 |
| F5 MD | N/mm² | 110 | 115 | 104 | 104 | 105 |
| F5 TD | N/mm² | 110 | 100 | 117 | 117 | 115 |
| Shrinkage MD | in % | 1.5 | 1.3 | 1.3 | 1.3 | 1.5 |
| Shrinkage TD | in % | 0.1 | 0.4 | 0.4 | 0.4 | 0.3 |
| Expansion MD at 100° C. | in % | 0.1 | 0 | 0 | 0 | -0.2 |
| Expansion TD at 100° C. | in % | 0 | 0 | 0 | 0 | 0 |
| SV film | | 738 | 728 | 738 | 738 | 740 |
| Surface tension σ (total) (surface A) | mN/m | 58.4 | 50.5 | 55.6 | 55.6 | 56.4 |
| Cold fog test | | A | A | A | A | A |
| Hot fog test | | A | B | B | A | A |

| | | Example 6 | Example 7 | Example 8 | Example 9 |
|---|---|---|---|---|---|
| Layer (μm) | Film thickness | 15 | 15 | 15 | 15 |
| | Thickness layer A | 0.8 | 0.8 | 0.8 | 0.8 |
| | Thickness layer B | 13.4 | 13.4 | 13.4 | 13.4 |
| | Thickness layer C | 0.8 | 0.8 | 0.8 | 0.8 |
| | Coating on surface A | Dry thickness 130 nm. Anti-fog coat. 1 (off-line proc.) | Dry thickness 65 nm. Anti-fog coat. 1 | Dry thickness 40 nm. Anti-fog coat. 1 | Dry thickness 40 nm. Anti-fog coat. 1 |
| | Coating on surface C | Dry thickness 150 nm. Acrylate coat. and application | Dry thickness 65 nm. Anti-fog coat. 1 | | Dry thickness 75 nm. Acrylate coat. and applicat. |

TABLE 2-continued

Properties for films in Examples 1-9

|  |  | method as in example 1 of EP 0144948 (off-line proc.) |  | method as in example 1 of EP 0144948 |  |
|---|---|---|---|---|---|
| A-layer | PET 1 | 89 | 89 | 89 | 89 |
|  | PET 2 | 10 | 10 | 10 | 10 |
|  | PET 3 | 1 | 1 | 1 | 1 |
|  | PET 4 |  |  |  |  |
| B-layer | PET 1 | 95 | 95 | 95 | 94.2 |
|  | PET 2 | 5 | 5 | 5 | 5 |
| C-layer | PET 1 | 89 | 89 | 34 | 89 |
|  | PET 2 | 10 | 10 | 15 | 10 |
|  | PET 3 | 1 | 1 | 1 | 1 |
|  | PET 4 |  |  | 50 |  |
| Transparency (web center) | in % | 95.5 | 95.3 | 93.1 | 94.5 |
| Haze |  | 17.8 | 17.8 | 10.5 | 9.8 |
| UV-stability UTS | in % | 63 | 63 | 70 | 64 |
| Flame test | Grade | 4 | 4 | 4 | 4 |
| E-Modul MD Young's Modulus MD | N/mm$^2$ | 4100 | 4100 | 4360 | 3950 |
| E-Modul TD Young's Modulus TD | N/mm$^2$ | 4550 | 4550 | 4800 | 4350 |
| F5 MD | N/mm$^2$ | 1015 | 1015 | 110 | 115 |
| F5 TD | N/mm$^2$ | 102 | 102 | 110 | 100 |
| Shrinkage MD | in % | 1.4 | 1.4 | 1.5 | 1.3 |
| Shrinkage TD | in % | 0.2 | 0.2 | 0.1 | 0.4 |
| Expansion MD at 100° C. | in % | 0 | 0 | 0.1 | 0 |
| Expansion TD at 100° C. | in % | 0.1 | 0.1 | 0 | 0 |
| SV film |  | 735 | 735 | 738 | 728 |
| Surface tension σ (total) (surface A) | mN/m | 56.5 | 56.5 | 58.4 | 50.5 |
| Cold fog test |  | A | A* | B | B |
| Hot fog test |  | A | A* | B | B |

Note
*Results apply to both film surfaces

Comparative Examples 1-7

The starting compositions and process for preparing the films in the comparative examples were as described for EXAMPLES 1-9 but the films were coated by the coating as described in in EP 1777251 A1 consisting of a hydrophilic coating in which the drying product of the coating composition contains water, a sulfopolyester, a surfactant and, optionally, an adhesion-promoting polymer. The resulting films have a hydrophilic surface which prevents short-term fogging of the films with water droplets.

Coating 3

The following composition of the coating solution was used:

- 1.0% by weight of sulfopolyester (copolyester of 90 mol % of isophthalic acid and mol % of sodium sulfoisophthalic acid and ethylene glycol)
- 1.0% by weight of acrylate copolymer consisting of 60% by weight of methyl methacrylate, 35% by weight of ethyl acrylate and 5% by weight of N-methylolacrylamide
- 1.5% by weight of diethylhexyl sulfosuccinate sodium salt (Lutensit A-BO BASF AG).

Table 3 summarizes the formulations, production conditions and resulting film properties for the films in the comparative examples 1-7:

TABLE 3

Properties for films in comparative examples 1-7

|  |  | Comparative Example 1 | Comparative Example 2 | Comparative Example 3 | Comparative Example 4 |
|---|---|---|---|---|---|
| Layer (μm) | Film thickness | 15 | 15 | 15 | 15 |
|  | Thickness layer A | 0.8 | 0.8 | 0.8 | 0.8 |
|  | Thickness layer B | 13.4 | 13.4 | 13.4 | 13.4 |
|  | Thickness layer C | 0.8 | 0.8 | 0.8 | 0.8 |

TABLE 3-continued

Properties for films in comparative examples 1-7

| | | Coating on surface A | Dry thickness 40 nm. Anti-fog coating 3 (In-Line) | Dry thickness 40 nm. Anti-fog coating 3 (In-Line) | Dry thickness 40 nm. Anti-fog coating 3 (Off-Line) | Dry thickness 40 nm. Anti-fog coating 3 (Off-Line) |
|---|---|---|---|---|---|---|
| | | Coating on surface C | | | | Dry thickness 75 nm. Acrylate coating and application method as in example 1 of EP0144948 |
| A-layer | PET 1 | | 89 | 89 | 89 | 89 |
| | PET 2 | | 10 | 10 | 10 | 10 |
| | PET 3 | | 1 | 1 | 1 | 1 |
| | PET 4 | | | | | |
| B-layer | PET 1 | | 95 | 95 | 95 | 95 |
| | PET 2 | | 5 | 5 | 5 | 5 |
| | PET 1 | | 34 | 89 | 89 | 89 |
| C-layer | PET 2 | | 15 | 10 | 10 | 10 |
| | PET 3 | | 1 | 1 | 1 | 1 |
| | PET 4 | | 50 | | | |
| Transparency (web center) | in % | | 92.3 | 91.6 | 91.8 | 94.4 |
| Haze | | | 10.2 | 10.9 | 11.3 | 11.0 |
| UV-stability UTS | in % | | 65 | 70 | 64 | 65 |
| Flame test | Grade | | 4 | 4 | 4 | 4 |
| E-Modul MD Young's Modulus MD | N/mm2 | | 4250 | 4300 | 3900 | 4000 |
| E-Modul TD Young's Modulus TD | N/mm2 | | 4820 | 4750 | 4400 | 4350 |
| F5 MD | N/mm2 | | 100 | 115 | 110 | 118 |
| F5 TD | N/mm2 | | 112 | 105 | 113 | 117 |
| Shrinkage MD | in % | | 1.4 | 1.7 | 1.5 | 1.3 |
| Shrinkage TD | in % | | 0.4 | 0.1 | 0.4 | −0.1 |
| Expansion MD at 100° C. | in % | | 0 | 0.1 | 0 | 0 |
| Expansion TD at 100° C. | in % | | 0.1 | 0 | 0 | 0 |
| SV Film | | | 720 | 738 | 728 | 738 |
| Surface tension σ (total) (surface A) | mN/m | | 46.7 | 49.8 | 51.5 | 50.2 |
| Cold fog Test | | | C | C | C | C |
| Hot fog Test | | | D | D | D | D |

| | | | Comparative Example 5 | Comparative Example 6 | Comparative Example 7 |
|---|---|---|---|---|---|
| Layer (μm) | | Film thickness | 15 | 15 | 15 |
| | | Thickness layer A | 0.8 | 0.8 | 0.8 |
| | | Thickness layer B | 13.4 | 13.4 | 13.4 |
| | | Thickness layer C | 0.8 | 0.8 | 0.8 |
| | | Coating on surface A | Dry thickness 25 nm. Anti-fog coating 1 | Dry thickness 40 nm. Anti-fog coating 1 | Dry thickness 25 nm. Anti-fog coating 1 |
| | | Coating on surface C | | | Dry thickness 75 nm. Acrylate coating and application method as in example 1 of EP0144948 |
| | A-layer | PET 1 | 89 | 89 | 89 |
| | | PET 2 | 10 | 10 | 10 |
| | | PET 3 | 1 | 1 | 1 |
| | | PET 4 | | | |
| | B-layer | PET 1 | 95 | 95 | 95 |
| | | PET 2 | 5 | 5 | 5 |
| | | PET 1 | 34 | 89 | 89 |
| | C-layer | PET 2 | 15 | 10 | 10 |
| | | PET 3 | 1 | 1 | 1 |
| | | PET 4 | 50 | | |
| | Transparency (web center) | in % | 92.5 | 91.8 | 94.3 |
| | Haze | | 11.8 | 11.8 | 11.8 |
| | UV-stability UTS | in % | 65 | 65 | 65 |

TABLE 3-continued

Properties for films in comparative examples 1-7

| | | | | | |
|---|---|---|---|---|---|
| Flame test | Grade | | 4 | 4 | 4 |
| E-Modul MD Young's Modulus MD | N/mm2 | | 4200 | 4200 | 4200 |
| E-Modul TD Young's Modulus TD | N/mm2 | | 4750 | 4750 | 4750 |
| F5 MD | N/mm2 | | 103 | 103 | 103 |
| F5 TD | N/mm2 | | 112 | 112 | 112 |
| Shrinkage MD | in % | | 1.4 | 1.4 | 1.4 |
| Shrinkage TD | in % | | 0.3 | 0.3 | 0.3 |
| Expansion MD at 100° C. | in % | | 0 | 0 | 0 |
| Expansion TD at 100° C. | in % | | 0.1 | 0.1 | 0.1 |
| SV Film | | | 720 | 720 | 720 |
| Surface tension σ (total) (surface A) | mN/m | | 45.4 | 58.2 | 45.4 |
| Cold fog Test | | | B | B | B |
| Hot fog Test | | | C | B | C |
| Note | | | | | |

Description of Test Methods

The following measurement methods were used to characterize the raw materials and films Measurement of Average Particle Diameter d50

The average particle size d50 was determined using a Malvern Master Sizer 2000. For this purpose, the particles to be used were dispersed in water and transferred into a cuvette which was analyzed in the measuring device, the size determination being effected by means of laser diffraction. In general, the detector takes an intensity image of the diffracted laser light, from which the particle size distribution is calculated by means of a mathematical correlation function from its angle-dependent light intensity. The particle size distribution is characterized by two parameters, the median value d50 (=position measurement for the mean value) and the degree of scattering SPAN98 (=measure for the particle diameter spread). The measurement was performed automatically and also included the mathematical determination of the d50 value.

Measurements on the film produced with these particles result in a 15-25% lower d50 value compared to the initial value of the particles before the start of production.

UV/Vis Spectra or Transmission at Wavelength x

Transmission of the films was measured in a UV/Vis double beam spectrophotometer (Lambda 12 or 35) Perkin Elmer USA. An approximately (3×5) cm wide film specimen is inserted into a flat sample holder perpendicular to the measurement beam in the beam path. The measurement beam was directed via a 50 mm integrating sphere toward the detector where the intensity is used to determine the transparency at the desired wavelength. The background was air. The transmittance is read at the desired wavelength.

Opacity/Transparency

The test serves to determine the opacity and transparency of plastic films in which the optical clarity or opacity is essential for the use value. The measurement is carried out on the Hazegard Hazemeter XL-21 1 from BYK Gardner according to ASTM D 1003-61. The transparency was measured according to ASTM-D 1003-61 (method A) using haze-gard plus from BYK-Gardner GmbH Germany, SV Value (Standard Viscosity)

The standard viscosity SV, was measured based on DIN 53 728 part 3, in an Ubbelohde viscometer at $(25\pm0.05)$ ° C. which measures the time required for the test solution to pass through a capillary. Dichloroacetic acid (DCE) was used as a solvent. The concentration of the dissolved polymer was 1 g of polymer/100 ml of pure solvent. The polymer was dissolved at 60° C. for 1 hour. If the samples were not completely dissolved after this time, the dissolution procedure was repeated twice for 40 min at 80° C. and the solutions were then centrifuged for 1 hour at a rotational speed of 4100 min-1.

From the relative viscosity $(\eta_{rel}=\eta/\eta_s)$, the dimensionless SV value is determined as follows:

$$SV=(\eta rel-1)\times 1000$$

To be able to compare the chain lengths of polymers used in an unfilled film versus a filled film, the amount of insoluble material has to be taken into account in case the film contains such particles. Polymer raw materials or film containing insoluble particles were dissolved in DCA and the insoluble pigments centrifuged off before measuring. The proportion of insoluble particles was determined by ash determination. In case a filled film is to be analyzed, a larger amount of filled film has to be dissolved in dichloroacetic acid compared to unfilled film. The following formula is used to calculate the weight of the sample to be dissolved in DCA in case the film contains insoluble particles:

Total weight of sample (filled film) to be dissolved in DCA=(weight of the sample for an unfilled film)/((100−insoluble particle content of filled film in wt. %)/100). For example if 0.4 g of standard unfilled film is dissolved in 40 ml DCA, and the filled film to be analyzed contains 5% insoluble particles (as determined by ash determination), 0.42 g of filled film has to be dissolved in DCA to compensate for the weight of insoluble particles:

0.4 g/((100−5)/100)=0.42 g

Mechanical Properties

The mechanical properties were determined by tensile test based on DIN EN ISO 572-1 and -3 (test specimen type 2) on film strips measuring 100 mm×15 mm.

Shrinkage

The thermal shrinkage was determined on square film samples with an edge length of 10 cm. The samples were cut in such a way that one edge ran parallel to the machine direction and one edge perpendicular to the machine direction. The samples were measured precisely (edge length $L_0$ was determined for each machine direction TD and MD, i.e. $L_{0\ TD}$ and $L_{0\ MD}$) and annealed 15 min at the stated shrinkage temperature (here 150° C.) in a forced-air drying cabinet. The samples were removed and measured precisely at room temperature (edge length $L_{TD}$ and $L_{MD}$). Shrinkage is calculated from the equation:

Shrinkage [%] MD=100×($L_{0\ MD}-L_{MD}$)/$L_{0\ MD}$, or

Shrinkage [%] TD=100×($L_{0\ TD}-L_{TD}$)/$L_{0\ TD}$

Expansion

The thermal expansion was determined on square film samples with an edge length of 10 cm. The samples were measured precisely (edge length $L_0$), annealed for 15 minutes at 100° C. in a forced-air drying cabinet, and then accurately measured at room temperature (edge length L). The expansion results from the equation:

Expansion [%]=100×($L-L_0$)/$L_0$ and was determined separately in each direction on the film.

UV Stability

The UV stability and the UTS value was determined and specified in % of initial value as in DE69731750 on page 8 (DE of WO9806575), except that the exposure time was not 1000 h but 2000 h.

Flame Resistance

A 30×30 cm piece of film was fastened with two clips at the corners and hung vertically. Generally, it must be ensured that at the point of suspension, there is no air movement, which moves the piece of film. A slight air from above is acceptable. The film piece was then exposed to a flame from below in the center of the lower side. For flame treatment, a commercial cigarette lighter, or better a Bunsen burner is used. The flame must be longer than 1 cm and less than 3 cm. The flame was held long enough to the film until this continued to burn without an ignition flame (at least 3 seconds). The flame was thereby held maximally for 5 seconds at the most, after which the burning and shrinkage was examined. Four such ignition processes were performed.

In the examples given here, the flame resistance is evaluated with the following grades: 1=the film was ignited during 4 ignitions, and never burned more than 3 seconds.
- 2=the film ignited and extinguished after less than 15 seconds, and more than 30% of the film surface remained.
- 3=the film ignited and extinguished after less than 20 seconds, and more than 30% of the film surface remained.
- 4=the film ignited and extinguished after less than 40 seconds, and more than 30% of the film surface remained.
- 5=the film ignited and extinguished after less than 40 seconds and more than 10% of the film surface remained.
- 6=the film ignited and burned more than 40 seconds, or less than 10% of the film surface remained after extinction.

Determination of the Refractive Index as a Function of Wavelength

To determine the refractive index of a film substrate and an applied coating or a coex layer which has a refractive index other than that of the base material as a function of wavelength, one uses spectroscopic ellipsometry. Background information and theory behind can for example be found in following publication: J. A. Woollam et al, Overview of variable angle spectroscopic ellipsometry-(VASE): I. Basic theory and typical applications, Proc. SPIE Vol. CR72, p. 3-28, Optical Metrology, Ghanim A. Al-Jumaily; Ed.

First one analyzes the base film without coating or modified coextruded layer. To suppress the back reflection of the film the back (side which is not analyzed) is roughened by a sandpaper with a fine grain size (for example, P1000). The sheet is then measured with a spectroscopic ellipsometer equipped with a rotating compensator, e.g. a M-2000 from J. A. Woollam Co., Inc. The machine direction of the sample film is parallel to the light beam. The measured wavelength is in the range of 370 to 1000 nm, the measurement angle is 65, 70 and 75°.

The ellipsometric data ψ and Δ are then modeled to match the experimental data. The Cauchy model is suitable in the present case $$n(\lambda) = A + \frac{B}{\lambda^2} + \frac{C}{\lambda^4} \text{ (wavelength } \lambda \text{ in microns).}$$

where n(λ) is the refractive index at wavelength λ. The parameters A, B and C are varied such that the data matches as closely as possible the measured spectrum ψ and Δ. To test the quality of the model the MSE value may be included to compare Model with measured data (ψ(λ) and Δ (λ)). MSE should be minimized.

$$MSE = \sqrt{\frac{1}{3n-m}\sum_{i=1}^{n}\left[\frac{(N_{E,i}-N_{G,i})^2 + (C_{E,i}-C_{G,i})^2 +}{(S_{E,i}-S_{G,i})^2}\right]} \cdot 1000$$

n=number of wavelengths,
m=number parameter fit
N=cos (2ψ),
C=sin (2ψ) cos (Δ),
S=sin (2ψ) sin (Δ) [1]

The resulting Cauchy parameters A, B and C for the base film allow the calculation of the refractive index n as a function of wavelength, valid in the measured range from 370 to 1000 nm.

The coating or a modified coex layer can be analyzed similarly. The parameters of the base film are now already analyzed and well known and should be kept constant during the modeling of the additional layer. Also for determining the refractive index of a coating or a coextruded layer the back of the film has to be roughened, as described above. Again, one can use the Cauchy model to describe the refractive index depending on the wavelength of the additional layer. The layer is now on the substrate, which has to be accounted for in the modeling. The thickness of the layer affects the spectrum obtained and must also be included in the modeling process.

Surface Tension

The surface free energy (surface free energy) was calculated from the contact angles using the Owens-Wendt-Rabel-Kaelble method according to DIN 5560-1,2. The test liquids are water, 1,5-pentanediol and diiodomethane (see Table 4). The contact angle was determined by means of a DSA-100 measuring device from Kruss GmbH, Germany. The evaluation according to Owens-Wendt-Rabel-Kaelble was carried out using the DSA software belonging to the device (as of 2005). For 1,5-pentanediols, values for the polar and dispersed fraction were taken over according to Gebhardt, for water and diiodomethane values according to Ström.

TABLE 4

|  | Interfacial tension IFT) (mN/m) | Dispersive interactions (mN/m) | Polar interactions (mN/m) |
|---|---|---|---|
| Water | 72.8 | 21.8 | 51 |
| 1,5-Pentanediol | 43.3 | 27.6 | 15.7 |
| Diiodomethane | 50.8 | 50.8 | 0 |

Figure 5:
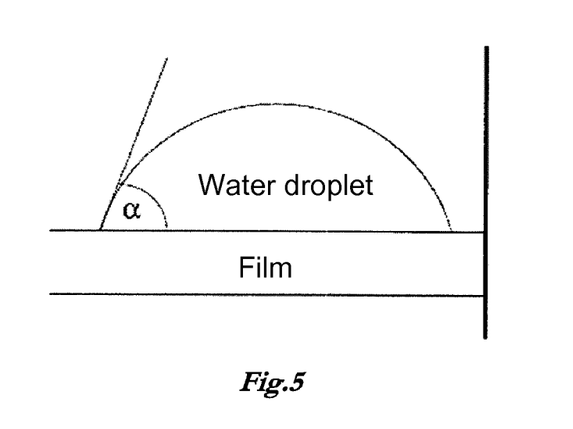
FIG. 5 shows the contact angle α during measurement of hydrophilicity of the film surface.

Measurement of the Contact Angle α (See FIG. 5)

As a measure of the hydrophilicity of the film surface (A), a static contact angle measurement of distilled water according to DIN 55660-1.2 is used. For measurement on static drops (B), the measuring instrument DSA-100 from the company Krüss GmbH with the software Ver. 4 is used. The determination takes place at 23° C. and 50% relative humidity on unfilled film samples conditioned in standard climate at least 16 hours beforehand. Using an automated dosage syringe type ME41, 3-5 μl of distilled water are applied to the film surface. The contact angle α is automatically determined every 5 seconds over a period of 20 seconds. Measurements are taken for four drops and the mean value of the contact angle α is formed from the 16 individual values.

Determination of the Anti-Fog Effect

Cold Fog Test: The anti-fogging properties of the polyester films are determined as follows: In a laboratory temperature controlled room at 23° C. and 50% relative humidity, film samples with anti-fog coatings were applied to a tray (length approx. 17 cm, width approx. 12 cm, height approx 3 cm) of amorphous polyethylene terephthalate (APET) containing approximately 50 ml of water (uncoated films are used as reference). The trays are stored in a refrigerator at a temperature of 4° C. and are placed at an angle of 30°. The films are evaluated after 12 h, 24 h, 1 week, 1 month, and 1 year. A film equipped with a permanent anti-fogging agent is also transparent after the condensation since the condensate forms a cohesive, transparent film. Without effective anti-fog agent, the formation of a fine droplet mist on the film surface leads to a reduced transparency of the film; in the worst case, the content of the tray is no longer visible.

A further investigation method is the so-called hot-steam or hot-fog test. A QCT condensation tester from Q-Lab is used. This simulates the anti-fogging effects of climatic moisture influences by condensing warm water directly on the film. In a few days or weeks, results can be reproduced which are caused by moisture within months or years. For this purpose, the water in the QCT condensation unit is heated to 60° C. and the film is clamped in the corresponding holder. The stretched film has an inclination angle of approximately 30°. The judgment is the same as described above. This test can be used to test the long-term antifogging effect or the washing-up resistance of the film, since the steam constantly condenses on the film and drains again and/or drips off. Easily soluble substances are washed off in this way and the effect of the anti-fogging effect is reduced. This test is also performed in a laboratory temperature controlled room at 23° C. and 50% relative humidity.

The evaluation of the anti-fog effect (anti-fog test) takes place visually.

Rating:
A: A transparent film that does not show any visible water, is completely transparent—excellent anti-fog effect
B: Some random, irregularly distributed water drops on the surface, discontinuous water film—acceptable anti-fog effect
C: A complete layer of large-translucent water droplets, poor transparency, lens formation, and drop formation—poor anti-fog effect
D: An opaque or transparent layer of large water droplets, no transparency, poor light transmission—very poor anti-fog effect

The invention claimed is:

1. A greenhouse screen comprising strips of film material that are interconnected by a yarn system of transverse threads and longitudinal threads by means of a knitting, warp-knitting or weaving process to form a continuous product, wherein at least some of the strips comprise a polyester film having a transparency of at least 93% as measured according to ASTM-D 1003-6 (method A), said polyester film having at least one base layer B comprising a thermoplastic polyester and a UV stabilizer, said polyester film has a first and a second surface, wherein an anti-fog coating is applied to at least one of the first or second surfaces of the polyester film, wherein said anti-fog coating is a dispersion composition and comprises
a) a hygroscopic, porous material;
b) a polymer-based crosslinker;
c) an adhesion-promoting organofunctional silane; and
d) one or more surfactants;
said anti-fog coating has a thickness of at least 60 nm and at the most 150 nm, and a refractive index of below 1.64 at a wavelength of 589 nm in the machine direction (MD) of the film, said refractive index being lower than the refractive index of base layer B.

2. The greenhouse screen according to claim 1, wherein the polyester film is a multi-layer film comprising a layer A applied to the base layer B, or a layer A and a layer C applied to the base layer B, the base layer B being located between the layer A and the layer C, and wherein the layers A and/or C comprise a thermoplastic polymer and a UV stabilizer.

3. The greenhouse screen according to claim 1, wherein a total thickness of the polyester film is at least 10 μm and at most 40 μm.

4. The greenhouse screen according to claim 1, wherein the base layer B consists of at least 70% by weight of a thermoplastic polyester, the thermoplastic polyester comprising at least 85 mol % units derived from ethylene glycol and terephthalic acid.

5. The greenhouse screen according to claim 1, wherein the polyester film has a Standard Viscosity (SV) value greater than 600, the SV value of the film being less than 950, when measured according to the method described in DIN 53 728 part 3.

6. The greenhouse screen according to claim 1, wherein the UV stabilizer is selected from the group consisting of triazines, benzotriazoles, benzoxazinones, and the base layer B and, if present, the layer A and/or the layer C contain the UV stabilizer in an amount of 0.3 to 3% by weight, based on the weight of the respective layer.

7. The greenhouse screen according to claim 1, wherein the refractive index of the anti-fog coating is below 1.60 at a wavelength of 589 nm in the machine direction of the film.

8. The greenhouse screen according to claim 1, wherein the thickness of the anti-fog coating is at least 70 nm and at most 130 nm.

9. The greenhouse screen according to claim 1, wherein an anti-fog coating is applied to the first or second surface of the polyester film, and a surface of the polyester film opposite to the anti-fog coating is provided with an antireflection modification layer, said antireflection modification layer is an antireflective coating, or is formed by an topcoat layer modification and has a refractive index when measured at a wavelength of 589 nm in the machine direction of the film which is lower than the refractive index of polyethylene terephthalate.

10. The greenhouse screen according to claim 9, wherein the anti-fog coating has a thickness of at least 30 nm and at most 60 nm.

11. The greenhouse screen according to claim 9, wherein the refractive index of the antireflective coating is below 1.64 at a wavelength of 589 nm in the machine direction of the film.

12. The greenhouse screen according to claim 9, wherein the anti-reflective coating contains more than 70 wt. % of methyl methacrylate and ethyl acrylate repeating units.

13. The greenhouse screen according to claim 9, wherein the anti-reflective coating comprises at least 1% by weight of a UV stabilizer (based on the dry weight of the anti-reflective coating).

14. The greenhouse screen according to claim 9, wherein the anti-reflective coating has a thickness of at least 60 nm and is at most 130 nm.

15. The greenhouse screen according to claim 9, wherein the topcoat layer modification is formed by co-extrusion on the base layer B, and the topcoat layer modification comprises a polyester which has a lower refractive index when measured at a wavelength of 589 nm in the machine direction of the film than the polyester of the base layer B.

16. The greenhouse screen according to claim 15, wherein the refractive index of the topcoat layer modification is below 1.70 at a wavelength of 589 nm in the machine direction of the film.

17. The greenhouse screen according to claim 15, wherein the polymer of the topcoat layer modification contains a co-monomer fraction of at least 2 mol (calculated with regard to the total mol % of the polymer in the topcoat layer).

18. The greenhouse screen according to claim 15, wherein the topcoat layer modification comprises more than 8 mol %, but less than 20 mol % of isophthalic acid (calculated with regard to the dicarboxylic acid component of the polyester).

19. The greenhouse screen according to claim 15, wherein the anti-fog coating has a thickness of at least 60 nm and at most 150 nm.

20. The greenhouse screen according to claim 1, wherein both the first and second surfaces of the polyester film are provided with anti-fog coatings.

21. The greenhouse screen according to claim 1, wherein the anti-fog and/or anti-reflective coatings are applied in-line during production of the biaxially oriented polyester film.

22. The greenhouse screen according to claim 1, wherein the anti-fog and/or anti-reflective coatings are applied to the first and/or second surfaces of the polyester film by means of off-line technology in an additional process step downstream of the film production.

23. The greenhouse screen according to claim 1, wherein one or more of said strips of film material has a width that is smaller than the distance between the longitudinal threads.

24. The greenhouse screen according to claim 23, wherein a gap is formed between said one or more strips of film material and the adjacent strip(s) of film, said gap permitting ventilation through said screen.

25. The greenhouse screen according to claim 1, wherein at least 10% of the strips of film material in the greenhouse screen comprise said single- or multilayer polyester film.

26. The greenhouse screen according to claim 1, wherein all strips of film material in the greenhouse screen are of said single- or multilayer polyester film.

27. A convection barrier comprising the greenhouse screen of claim 1.

* * * * *